(12) United States Patent
Berger et al.

(10) Patent No.: US 6,396,402 B1
(45) Date of Patent: May 28, 2002

(54) METHOD FOR DETECTING, RECORDING AND DETERRING THE TAPPING AND EXCAVATING ACTIVITIES OF WOODPECKERS

(75) Inventors: Robert Paul Berger; Alexander Leslie McIlraith, both of Winnipeg (CA)

(73) Assignee: Myrica Systems Inc., Winnipeg (CA)

( * ) Notice: Subject to any disclaimer, the term of this patent is extended or adjusted under 35 U.S.C. 154(b) by 0 days.

(21) Appl. No.: 09/803,665

(22) Filed: Mar. 12, 2001

(51) Int. Cl.$^7$ ............................................... G08B 23/00
(52) U.S. Cl. .............................. 340/573.2; 340/384.72; 119/713
(58) Field of Search ........................... 340/384.2, 384.3, 340/384.6, 384.72, 384.4, 573.1, 573.2, 573.3; 116/22 A; 119/712, 713, 719, 721, 906; 367/139

(56) References Cited

U.S. PATENT DOCUMENTS

| | | | |
|---|---|---|---|
| 4,144,832 A | * 3/1979 | Dahl | 116/22 A |
| 4,965,552 A | 10/1990 | Price et al. | 340/566 |
| 5,134,592 A | 7/1992 | Parra | 367/139 |
| 5,214,619 A | 5/1993 | Yoshida | 367/139 |
| 5,243,327 A | 9/1993 | Bentz et al. | 340/566 |
| 5,450,063 A | * 9/1995 | Peterson et al. | 340/573.2 |
| 5,956,463 A | 9/1999 | Patrick et al. | 119/906 |
| 5,986,551 A | 11/1999 | Pueyo et al. | 340/573.1 |
| 6,016,100 A | * 1/2000 | Boyd et al. | 340/384.2 |
| 6,285,630 B1 | * 9/2001 | Jan | 367/139 |
| 6,328,986 B1 | * 12/2001 | Ballinger, Jr. | 424/405 |

* cited by examiner

Primary Examiner—Van T Trieu
(74) Attorney, Agent, or Firm—Adrian D. Battison; Michael R. Williams; Ryan W. Dupuis

(57) ABSTRACT

An apparatus for deterring woodpeckers from tapping on and excavating within a utility pole or the like includes a housing having mounting flanges for direct attachment to the pole so as to receive vibrations therefrom. A transducer is attached to the mounting wall so as to convert the vibrations preferentially over airborne sounds into signals. A circuit compares the vibrations with a long term average and emits an output in response to detection above a threshold, whereupon the outputs are counted and if the number within a predetermined time exceeds a preset minimum a sound transmitter is actuated for emitting a deterrent sound externally of the housing. A memory contains a plurality of separate audible deterrent sounds including some of the same species and some of predators which act as a deterrent to the woodpeckers and these are selected sequentially and transmitted after a delay to avoid habituation. The power source includes a solar cell charging a battery and to maintain battery power the circuit is arranged to partially power down between detecting periods, to prevent sound actuation at certain times of day and certain times of year and to issue deterrent sounds only once for every set time period.

20 Claims, 2 Drawing Sheets

METHOD FOR DETECTING, RECORDING AND DETERRING THE TAPPING AND EXCAVATING ACTIVITIES OF WOODPECKERS

This invention relates to an apparatus and method of deterring excavation of wooden objects such as utility poles by woodpeckers.

BACKGROUND OF THE INVENTION

Woodpeckers strike objects with their beaks for several purposes. They tap on structures to communicate their presence to other woodpeckers; sequences of taps that are species specific, called drums, are also made as part of territorial and mating behaviors. They make small excavations in wooden objects in their search for insect food items located beneath the surface. Large excavated cavities are made in trees and other similar objects using the beak. These cavities are used for roosting and nesting purposes.

Although woodpeckers historically have tapped on and excavated in trees, man-made structures have become a common target for these types of activities. Woodpeckers can cause damage to objects while engaged in tapping and excavation behaviors. Considerable damage has been reported on wooden utility poles, which woodpeckers utilize in a similar manner to natural trees. Excavations of large woodpecker species, such as the Pileated Woodpecker (*Drycopus pileatus*) can be larger and cause the larger amounts of damage.

A number of approaches have been tried to deter woodpeckers, particularly the Pileated Woodpecker, from damaging utility poles. The majority are passive deterrents, while others are active (and occasionally automated electronic) deterrents. Passive devices include visual repellents, tactile repellents, chemosensory repellents and physiologic repellents. Visual repellents include balloons with large 'eyespots' that resembles a predator, raptor models and silhouettes, and iridescent or holographic tape. Visual deterrents are usually mounted on or near utility poles and act as a scaring device. Tactile repellents include polybutene products and roost inhibitors such as spikes or nets. These techniques provide protective measures such as pole wrapping that do not allow woodpeckers to cling to the smooth surface of the plastic wrap. Metal barriers such as wire wrapped around a pole are currently the most widespread and effective technique for preventing woodpecker damage. Chemosensory and physiologic repellents include chemicals such as methyl anthranilate or mesurol. These types of repellents act either on contact or through ingestion of the materials.

A limited number of active devices include auditory repellents (both sonic and ultrasonic), programmable propane 'bangers', and strobe lights. All of these deterrent devices are used to produce 'startle' responses. Auditory repellents include devices with electronically reproduced and broadcasted distress calls, devices that generate very loud sounds by propane explosions and pyrotechnics that are used to scare loafing and roosting birds. Ultrasonic devices are offered as deterrents to roosting and loafing birds, but these devices have no demonstrated utility, probably because most birds are physiologically incapable of detecting ultrasound (i.e., frequencies above 20,000 Hz). At least one deterrent device available in the marketplace is an automated electronic unit.

None of the previously described deterrent methods provided a satisfactory solution for preventing woodpecker damage due to problems with: cost, effectiveness, environmental toxicity, electrical conductivity hazards, devices being bothersome to people or subsequent increases in the difficulty of maintaining pole hardware.

The following patents have been located in a search:

U.S. Pat. No. 4,965,552 issued October 1993 by Price et al entitled "Electronic Animal Repellant Apparatus" issued October 1990 discloses a device for animals in general which uses sounds generated by a speaker where the key point is that the sounds are delayed by a random time period after detection to avoid the animal becoming habituated to the sounds.

U.S. Pat. No. 5,986,551 issued November 1999 by Pueyo et al and entitled "Method and System for Preservation Against Pesky Birds and Pest Animals" discloses a method for dissuading the animals from returning after an initial frightening action.

U.S. Pat. No. 5,956,463 issued September 1999 by Patrick et al entitled "Audio Monitoring System for Assessing Wildlife Bio-diversity" discloses a microphone and analysis system for detecting and analyzing bird sounds in the environment.

U.S. Pat. No. 5,243,327 issued September 1993 by Bentz et al entitled "Audible Alarm for Motion Detection using Dual Mode Transducer" discloses a transducer which detects the presence of a pet or animal by detecting sounds in the range 20 to 250 Hz generated by the movement of the animal.

U.S. Pat. No. 5,214,619 issued May 1993 by Yoshida entitled "Supersonic Sound Emission Device" discloses a device within a housing for mounting on a pole which is used to generate high frequency sounds with the intention of scaring birds.

U.S. Pat. No. 5,134,592 issued July 1992 by Parra entitled "Method and Apparatus for Separating Dolphin from Tuna" discloses a method of dispersing dolphins by playing sounds from a predator that is the killer whale.

None of these prior patents provide an arrangement suitable to deter the excavation activities of woodpeckers.

SUMMARY OF THE INVENTION

This invention is intended to deter woodpeckers from tapping on and excavating within objects.

The invention therefore provides an apparatus for deterring woodpeckers from tapping on and excavating within an object comprising:

a housing having a mounting assembly for mounting the housing on the object so as to receive vibrations therefrom;

a transducer arranged for converting vibrations in the object and into electrical signals, the transducer being arranged to be responsive to the vibrations preferentially over airborne sounds;

a sound transmitter for emitting a deterrent sound externally of the housing;

a memory containing a plurality of audible deterrent sounds which act as a deterrent to the woodpeckers;

and a processing circuit arranged to:

process the electrical signals to discriminate transient woodpecker induced vibrations from long-term background vibrations and to provide an output signal in response to detection of a woodpecker induced vibration;

count the number of output signals within a predetermined time interval;

and, when a predetermined count is reached within the predetermined time interval, to effect actuation of the deterrent by extracting at least one of the sounds from the memory and activating the sound transmitter to transmit the sound.

Preferably the audible deterrent sounds in the memory include a plurality of different sounds at least one of which is generated by woodpeckers and at least one of which is generated by woodpecker predators.

Preferably the processing circuit is arranged to select for sequential actuations different ones of said sounds.

Preferably the processing circuit is arranged such that the audible deterrents generation are halted when the power source voltage is low.

Preferably there is provided a clock providing an indication of time and wherein the processing circuit is arranged such that the audible deterrents generation are halted at certain times of day or days of year.

Preferably the processing circuit is arranged such that the audible deterrents generation are delayed after the predetermined count is reached for a predetermined delay period.

Preferably the processing circuit is arranged such that the audible deterrents generation are limited to a certain number within a predetermined time period to avoid repeated generations from draining the power source.

Preferably the processing circuit is arranged such that the signals are discriminated by comparing a long-term average of the signal energy and a short term average of signal energy.

Preferably the processing circuit is arranged such that the signals are discriminated by comparing short-term average signal energy which must exceed the long term average signal by a threshold value amount.

Preferably the processing circuit is arranged such that the short-term average signal energy is determined using a peak detector with a short time constant and the long term average signal is determined using a peak detector with a long time constant.

Preferably a piezoelectric transducer is used to convert vibrations into electrical signals which is mounted within the housing and arranged to receive vibrations directly from the connection between the housing and the object.

Preferably the transducer is a contact microphone which is mounted within the housing and arranged to receive vibrations directly from the connection between the housing and the object.

Preferably the processing circuit is arranged such that periodically after a predetermined time period information is stored in a memory of the number of detected vibrations along with an indication of the day and time.

Preferably the processing circuit is arranged such that the information stored includes whether the deterrent was actuated in the time period.

Preferably the housing has a cover over an upper wall thereof to reduce spurious vibrations caused by impact of objects on the housing.

Preferably the cover is flexible.

Preferably there is provided on the housing a data output element such that data can be transferred from the memory to a remote location.

Preferably there is provided on the housing a light output element visible from an observer on the ground adjacent the object such that data can be transferred from the memory to the observer and wherein the processing circuit is arranged such that the light output element is actuated each time a predetermined count is reached whereby an observer can actuate the output by tapping on the object.

Preferably the sound emitted is directed by a baffle mounted on the housing so as to direct the sound from the speaker along the object to the woodpecker on the object.

Preferably the processing circuit is arranged such that it is partially deactivated and deactivates components of the circuit for a predetermined time period and is reactivated periodically to check for detected vibrations.

The arrangement thus preferentially detects vibration in the object rather than the presence of air-borne sounds. Based on analysis of the vibration, sounds are emitted that deter the woodpeckers.

The electronic circuitry is housed within a weather-resistant housing. The housing is protected from spurious vibrations induced by falling precipitation by a shield or foam covering. The housing is mounted on the object to be protected from woodpecker activity.

Several commonly known aspects of animal behavior are relevant in the development of a new means for deterring woodpeckers from tapping on and excavating objects. First, woodpeckers tap, drum and make vocal calls to communicate. Secondly, woodpeckers change their behavior in response to the sounds of their own species (taps, drums and calls) as well as to key predators such as hawks. Thirdly, animals tend to become habituated to, that is to say respond in less to, stimuli (e.g. sounds) which occur repeatedly over a long time period.

Vibrations can be detected electronically by mounting a vibration-sensitive transducer to an object. Analysis of the resulting signal produced by the transducer can be used to determine whether or not certain events have occurred on or within the object. Such events can be counted, their frequency of occurrence per unit of time determined and the results stored (logged) or acted upon.

Although active deterrents for wildlife exist, there appears to be no device that is targeted specifically for detecting tapping or excavation of a woodpecker on an object, logging its activity pattern and subsequently acting to deter the woodpecker based on its known behaviors. By performing some or all of these functions, this invention overcomes many of the problems associated with currently available techniques.

The invention also includes a transducer (vibration sensor or microphone) sensitive to vibration, an amplifier to amplify the transducer signal, and a means to discriminate signals from 'tap-like' vibrations based on their amplitude from signals produced by more constant 'background' vibrations. When a 'tap' is detected, an event is counted.

The invention maintains counts of the number of events that occur within a given time period. The count can be stored (logged) in a non-volatile memory along with time and date information for later retrieval.

When a certain number of events are counted within a time interval, the device activates circuitry to produce one of a series of sounds. Activation can be modified in a number of ways. Activation can be delayed for a set period of time. Activation may be inhibited based on time of day or day of year. Activation may be inhibited based on the condition of the power source.

Sounds are based on recordings of natural sounds so that they are intended to sound natural to woodpeckers, and they sound natural and are presumed not to be as irritating to humans as are unnatural sounds. Sounds include sounds made by woodpeckers and their predators. Each time the device is activated, one of several sounds is produced to reduce habituation. Sounds are played in sequence for a duration equal to their length in time. The device stores sound data digitally in a non-volatile memory. Digital data is converted to an analog form by a digital to analog converter (DAC), is low-pass filtered, is amplified by a power amplifier and is converted to audible sound by one or more audio transducers such as speakers. The direction in which the sound is emitted may be modified with a baffle to improve effectiveness.

Although the invention could be powered by any reasonable power source, the preferred method utilizes a solar panel (photo-voltaic array or module) to charge a rechargeable battery.

The device contains a means for setting parameters of activation and operation and a means for setting and determining time of day and/or day of year.

The device may include a provision for serial data communications between it and an external terminal device. Serial communications are utilized for reading and writing parameter values and data.

DESCRIPTION OF THE PREFERRED EMBODIMENT

Figure 1:
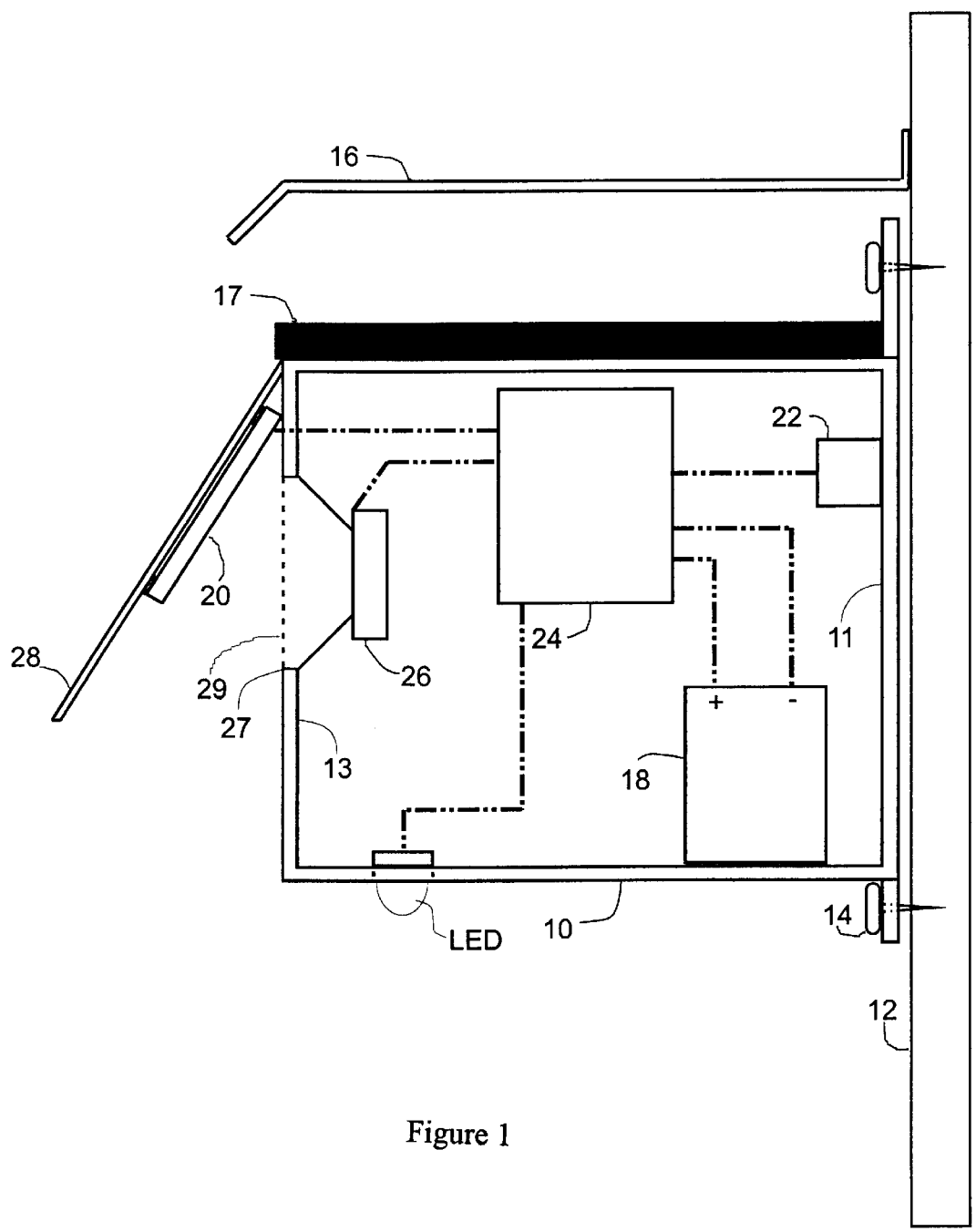
FIG. 1 is an overall block diagram of the deterrent system.

As shown in FIG. 1, the deterrent and logging system is housed in weather-resistant housing 10 such that electronic equipment is not damaged by weather. The weather resistant substantially enclosed housing 10 includes a front wall 13, top and bottom walls and side walls together with a rear wall 11 which is mounted onto a substrate 12, usually wooden objects such as at the top of a utility pole, by mounting device 14. This comprises as shown upper and lower flanges which extend from the rear wall 11 in the same plane as the rear wall and are attached directly to the post or other substrate 12 by fasteners such as screws or nails. Mounting the device firmly to the substrate 12 ensures that vibrations in the substrate 12 are effectively coupled to the device circuitry.

The housing 10 has rigid shield 16 located on the post above it and separated from it so as to isolate it from spurious vibrations caused by impact of objects on the housing.

Alternatively or in addition, the housing may include a flexible cover 17 which also acts to isolate vibrations from rain or the like. For this purpose a sheet of a perforated flexible fabric material bonded to the side walls of the housing and bridging the top wall has been found to be suitable. This type of material can be resistant to degradation by UV or weather and does not collect moisture but prevents the rain drops from directly impacting on the housing.

The housing 10 contains rechargeable battery 18, charged by an external power source such as a solar panel 20. This, together with the power saving steps set out hereinafter, permits the device to run unattended for long periods of time.

A transducer 22 is located within the housing 10 and is acoustically coupled to the rear wall 11 of the housing 10 and in turn, through the mounting 14 to the substrate 12. This configuration in which the transducer sits on the rear wall substantially in direct communication with the substrate increases sensitivity to vibration while at the same time reducing the sensitivity to airborne sound. The transducer 22 preferably comprises a piezo electronic microphone, a vibration sensor, transducer or an accelerometer. The electrical signal generating by the transducer 22 is processed in a circuit board 24 to discriminate woodpecker taps from longer term background vibrations as explained hereinafter.

An audio output signal from circuit board 24 is converted to sound by a weatherproof speaker 26. A baffle 28 in the form of an angled plate, formed from a transparent material such as acrylic, is mounted on the front wall 13 of the housing and extends across the front face of the speaker and acts to redirect the sound from the forwardly directed speaker in the desired direction, which in the example shown is downwardly, so as to increase the effectiveness of the device. Normally the housing will be mounted at the top of the pole to keep it away from animals or vandalism and hence the woodpecker activity will normally be below the housing. The weatherproof speaker 26 is mounted at an opening 27 in the front wall which is protected from weather, insects and other objects by a protective screen 29. In some cases, more than one of weatherproof speaker 26, baffle 28 and protective screen 29 can be used to increase the effectiveness of the deterrent. The solar panel is mounted on the underside of the inclined baffle for protection but receives light through the transparent baffle.

Figure 2:
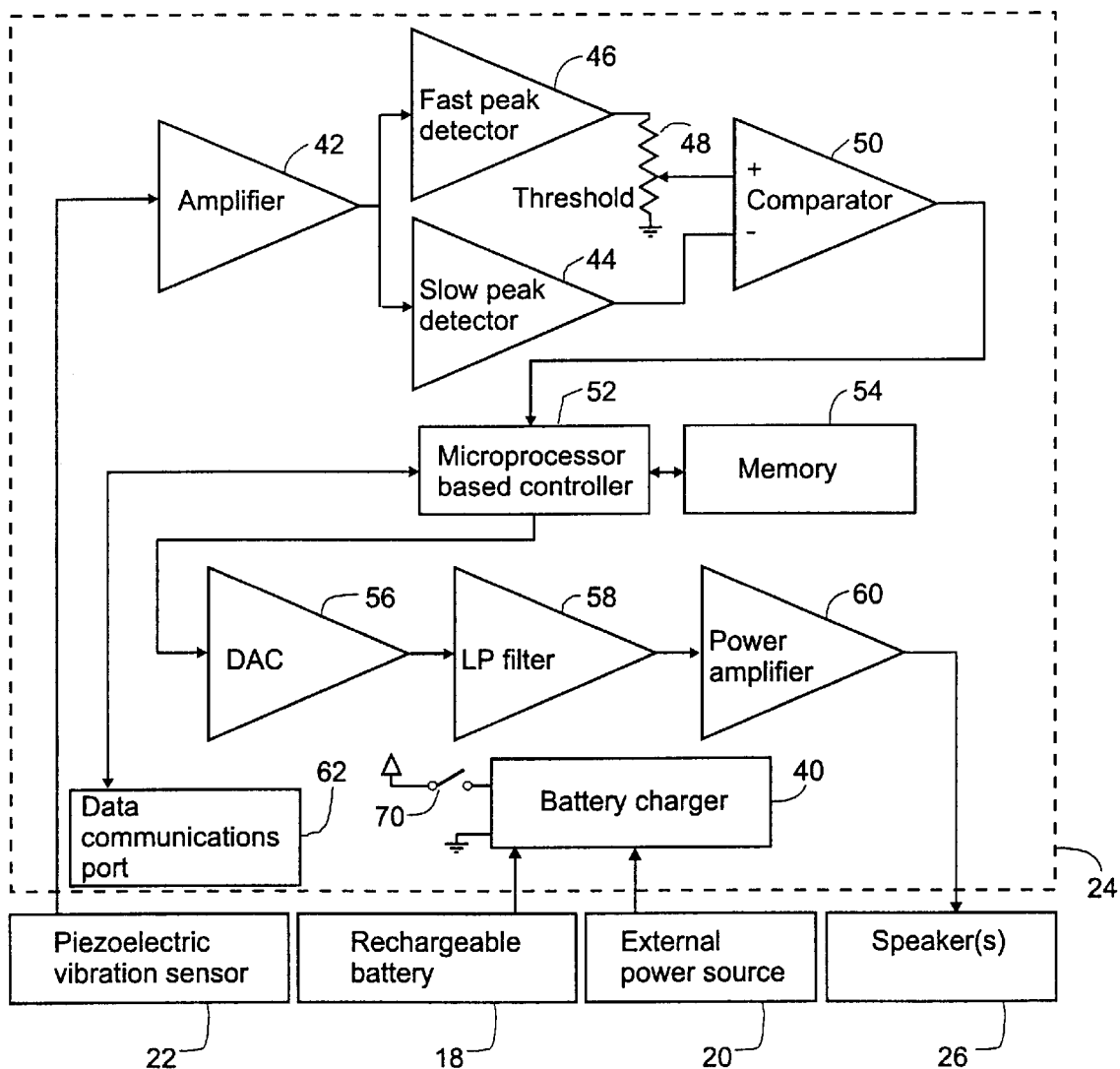
FIG. 2 is a block diagram of the electronic components of FIG. 1.

Details of system components located on the circuit board 24 and external connections to circuit board 24 are illustrated in FIG. 2. The circuitry is powered by the rechargeable battery 18, which is charged from the external solar panel 20 using a charging circuit 40 of a conventional nature.

Electrical signals generated by the transducer 22 are amplified by an amplifier 42. The circuit for the amplifier 42 is band limited. A slow peak detector 44 is arranged due to selection of a long RC time constant to generate a voltage related preferentially to the long term average of energy or power in the amplified transducer signal. In doing so, its output is a measure of long term vibration energy. A fast peak detector 46 also responds to the amplified signal but, due to its shorter RC time constant responds more quickly than the slow peak detector 44. Thus the fast peak detector responds preferentially to short term (transient) vibrations that have more energy than the background level. A comparator 50 is provided to compare the outputs of the detectors 44 and 46 and to change state when transient vibrations greater than a given magnitude above the long-term average occur. The threshold for the required amplitude of the short term signals to trigger a change in state is set by operation of a potentiometer 48 thus allowing the device too ignore vibrations of low intensity, which may be from another source or may be woodpecker activity of low intensity.

The amplifier 42, peak detectors 44 and 46 and comparator 50 in the preferred embodiment are constructed from operational amplifiers using circuits well known to those skilled in the art. In an alternative arrangement, the function of these circuits could be accomplished digitally after first converting the electrical signal from transducer 22 to a digital format using an analog-to-digital converter (ADC).

Software running in a microprocessor 52: tracks time of day, tracks day of year and measures battery status (voltage).

This software also receives and counts the number of state changes or output signals received from comparator 50 within a set time interval of predetermined length. Counting signals within a predetermined time interval permits the device to be set by selecting the time period to ignore false trigger events of low frequency. Thus the microprocessor acts to count the signals each of which represents a single vibration caused by the woodpecker and only activates a deterrent event when the count reaches a predetermined number within that time period. In one example, the time period may be set at 30 seconds and the count set at 10. Thus a woodpecker when tapping for signaling to other birds may do 10 taps per second in bursts of 2 seconds and hence a count of more than 10 is most likely to be caused by the woodpecker intended to be detected. A time period greater than 2 seconds is thus also likely to be suitable to distinguish from other sounds, but setting the period as long as 30 seconds will allow detection of very short bursts repeated within that time period.

The microprocessor runs in a low power mode or acts to partially power down for predetermined time periods to conserve battery power and has the capability of turning off those power consuming elements primarily related to the deterrent generating components when these are not required. Thus, the microprocessor may power down for 4 seconds and power up only sufficiently to advance the clock. Also, the processor may power up briefly each time that a vibration has been detected. The processor counts vibrations to determine whether the count reaches the set limit of for example 10 within the set portion of for example 30 seconds. A value of one may also be subtracted from the count periodically, for example at 30 second intervals, to compensate for infrequent taps.

Other conditions are then checked to determine whether or not a deterrent activation is to occur. Other conditions can include, but are not limited to time of day, day of year and battery status. The particular conditions mentioned here are important since they limit deterrent activation at times of day and year when woodpeckers are known not to be active, and when the battery voltage is too low to support deterrent operation.

The processor is also arranged such that it limits the number of deterrent activations to a set number per set time period. Thus for example the set time period may be of the order of 15 minutes, which is the same as the logging time period described hereinafter. The number of activations may then be set at one only so as to conserve battery operation. It will be appreciated that the intention is to deter woodpecker damage and this is best achieved by maintaining the deterrent effect repeatedly over an extended period rather than necessarily emitting the deterrent sounds every time the woodpecker presence is detected. The sound activation is particularly power heavy so that the number of sound activations is limited in this way to a number which the device can achieve while never draining the power source. The fact that the deterrent sound is not emitted each and every time the woodpecker taps also acts to prevent habituation.

Activation of the deterrent is delayed for a fixed period of time, for example 15 to 30 seconds, after the requirement is determined by the above characteristics and such delays are likely to reduce the possibility that woodpeckers learn to relate their activity to activation of the deterrent. All conditions can be set as stored parameters.

A plurality of separate deterrent sounds is stored in digital format in a memory 54 and these stored sound recordings include woodpecker sounds and those of their predators. Thus for example five different deterrent sounds can be stored digitally for use as required. In this example, four may be sounds made by a bird of the same species as the birds are territorial and will be deterred by the presence of another bird. These may include bird calls and may include signaling taps similar to those detected by the device.

When a deterrent is activated and after the fixed delay, one of the series of digitally recorded sounds stored in the memory 54 is retrieved and sent to DAC 56. The sounds are selected in round robin order or randomly and are played for their full duration. Thus for a next event a different one of the sounds is selected so as to avoid the woodpecker becoming familiar with the sound patterns. Both the delay, the use of different sounds and the fact that sometimes there is no activation all assist thus to avoid or reduce habituation.

The DAC 56 converts the digital values in the recorded sounds to their analog equivalent. The analog signal so generated is further filtered by a low pass filter 58 to remove high frequency artifacts introduced by the DAC 56 itself. A power amplifier 60 is turned on by microprocessor 52 when a deterrent sound is being played through the DAC 56 and amplifies the analog signal from the low pass filter 58 to drive the speaker 26. The resulting sound is intended to disturb the woodpecker's excavation behavior.

In addition to providing deterrent functions, the device is capable of logging data in the memory 54. This logging process is repeated every set time period over the time of use. Thus a logging time period of for example 15 minutes can be used to provide information useful to check on local bird activity and the operation of the device. This data may include time of day, day of year, vibrations counts, whether the deterrent has been activated within the time period and various measurements of system status or environment including temperature and battery status. The memory may be part of the microprocessor or may be external to it.

Parameters may be set and read by an external device via a data communications port 62. In addition logged data can be extracted and sound files loaded into the deterrent device through the same port. Time of day and day of year can also be read and set via this port. Any other digital information available within the system can be read and written via this port.

An on/off switch 70 is provided at the battery to turn off the device when not installed.

A light emitting element such as an LED is mounted on the outside of the bottom wall of the housing so as to be visible from the ground. This can be used instead of or as well as the port 62 to communicate with observers on the ground. In particular, a simple but effective arrangements causes the LED to emit coded data each time the deterrent sounds are activated. Thus an observer on the ground can activate the device by tapping on the pole a sufficient number of times to activate the deterrent whereupon the LED will emit data as determined from the memory by the processor. This may be just sufficient to confirm proper operation or it may provide extensive data from the memory as required by the particular device and its intended use by the observer.

Since various modifications can be made in my invention as herein above described, and many apparently widely different embodiments of same made within the spirit and scope of the claims without departing from such spirit and scope, it is intended that all matter contained in the accompanying specification shall be interpreted as illustrative only and not in a limiting sense.

What is claimed is:

1. Apparatus for deterring woodpeckers from tapping on and excavating within an object comprising:
   a housing having a mounting assembly for mounting the housing on the object so as to receive vibrations therefrom;
   a transducer arranged for converting vibrations in the object and into electrical signals, the transducer being arranged to be responsive to the vibrations preferentially over airborne sounds;

a sound transmitter for emitting a deterrent sound externally of the housing;

a memory containing a plurality of audible deterrent sounds which act as a deterrent to the woodpeckers;

and a processing circuit arranged to:

process the electrical signals to discriminate transient woodpecker induced vibrations from long-term background vibrations and to provide an output signal in response to detection of a woodpecker induced vibration;

count the number of output signals within a predetermined time interval;

and, when a predetermined count is reached within the predetermined time interval, to effect actuation of the deterrent by extracting at least one of the sounds from the memory and activating the sound transmitter to transmit the sound.

2. The apparatus according to claim 1 wherein the audible deterrent sounds in the memory include a plurality of different sounds at least one of which is generated by woodpeckers and at least one of which is generated by woodpecker predators.

3. The apparatus according to claim 1 wherein the processing circuit is arranged to select for sequential actuations different ones of said sounds.

4. The apparatus according to claim 1 wherein the processing circuit is arranged such that the audible deterrents generation are halted when the power source voltage is low.

5. The apparatus according to claim 1 wherein there is provided a clock providing an indication of time and wherein the processing circuit is arranged such that the audible deterrents generation are halted at certain times of day or days of year.

6. The apparatus according to claim 1 wherein the processing circuit is arranged such that the audible deterrents generation are delayed after the predetermined count is reached for a predetermined delay period.

7. The apparatus according to claim 1 wherein the processing circuit is arranged such that the audible deterrents generation are limited to a certain number within a predetermined time period to avoid repeated generations from draining the power source.

8. The apparatus according to claim 7 wherein the processing circuit is arranged such that the signals are discriminated by comparing short-term average signal energy which must exceed the long term average signal by a threshold value amount.

9. The apparatus according to claim 8 wherein the processing circuit is arranged such that the short-term average signal energy is determined using a peak detector with a short time constant and the long term average signal is determined using a peak detector with a long time constant.

10. The apparatus according to claim 1 wherein the processing circuit is arranged such that the signals are discriminated by comparing a long-term average of the signal energy and a short term average of signal energy.

11. The apparatus according to claim 1 wherein a piezo-electric transducer is used to convert vibrations into electrical signals which is mounted within the housing and arranged to receive vibrations directly from the connection between the housing and the object.

12. The apparatus for deterring woodpeckers according to claim 1 wherein the transducer is contact microphone which is mounted within the housing and arranged to receive vibrations directly from the connection between the housing and the object.

13. The apparatus according to claim 1 wherein the processing circuit is arranged such that periodically after a predetermined time period information is stored in a memory of the number of detected vibrations along with an indication of the day and time.

14. The apparatus according to claim 13 wherein the processing circuit is arranged such that the information stored includes whether the deterrent was actuated in the time period.

15. The apparatus according to claim 13 wherein the processing circuit is arranged such that it is partially deactivated and deactivates components of the circuit for a predetermined time period and is reactivated periodically to check for detected vibrations.

16. The apparatus according to claim 1 wherein the housing has a cover over an upper wall thereof to reduce spurious vibrations caused by impact of objects on the housing.

17. The apparatus according to claim 1 wherein the cover is flexible.

18. The apparatus according to claim 1 wherein there is provided on the housing a data output element such that data can be transferred from the memory to a remote location.

19. The apparatus according to claim 1 wherein there is provided on the housing a light output element visible from an observer on the ground adjacent the object such that data can be transferred from the memory to the observer and wherein the processing circuit is arranged such that the light output element is actuated each time a predetermined count is reached whereby an observer can actuate the output by tapping on the object.

20. The apparatus according to claim 1 wherein the sound emitted is directed by a baffle mounted on the housing so as to direct the sound from the speaker along the object to the woodpecker on the object.

* * * * *